United States Patent [19]

Ikeda

[11] Patent Number: 4,801,214
[45] Date of Patent: Jan. 31, 1989

[54] COLOR FILTER FOR WIND-UP SYSTEM COLOR CHANGER

[75] Inventor: Yoshiaki Ikeda, Tokyo, Japan
[73] Assignee: Ryudensha Co., Ltd., Tokyo, Japan
[21] Appl. No.: 63,585
[22] Filed: Jun. 17, 1987
[30] Foreign Application Priority Data Jul. 4, 1986 [JP] Japan .............................. 61-102097[U]

[51] Int. Cl.⁴ .............................................. B65D 30/00
[52] U.S. Cl. ......................................... 383/37; 383/38; 383/123; 383/109; 350/317; 350/318; 350/130
[58] Field of Search ........................ 383/37, 38, 39, 40, 383/123, 124, 105, 109; 350/315, 317, 318, 311, 130

[56] References Cited

U.S. PATENT DOCUMENTS 2,647,680  8/1953  Vogt ........................................ 383/37
3,186,473  6/1965  Myers et al. ........................... 350/17
4,598,421  7/1986  Jostler .................................... 383/37

FOREIGN PATENT DOCUMENTS 741574  9/1943  Fed. Rep. of Germany ...... 350/130

*Primary Examiner*—Willis Little
*Attorney, Agent, or Firm*—Frishauf, Holtz, Goodman & Woodward

[57] ABSTRACT

There is disclosed a color filter for wind-up system color changer which comprises two sheets of laminated transparent films in continuous length, having a plural number of units each comprising a sheet of a transparent film folded in two provided in series sealed between the films in continuous length with its line of flection being disposed along the longer direction of the films in continuous length, and the edges of the units on the opposite side to the line of flection being under the state opened.

3 Claims, 1 Drawing Sheet

COLOR FILTER FOR WIND-UP SYSTEM COLOR CHANGER

BACKGROUND OF THE INVENTION

This invention relates to a color filter for wind-up system color changer, more particularly to a color filter with a novel structure capable of exchanging color filter units.

On stages or in television studios, colorful color scenes are presented by use of a color changer in order to emphasize the performance effect of the dramas, actions, etc., performed there.

As the color changer used, a variety of kinds of machines have been known and among them, there is, for example, a wind-up system color changer.

Such a color changer usually consists of a projection lamp and a color filter housing box mounted ahead thereof. And, on the both left and right ends internally of the housing box, rotatory rolls are provided, respectively, with the color filters being scanned between the both rolls in the form of winding up the color filters wound up on one rotatory roll onto the other.

The color filter used in such a kind of machine is a light-transmissive film in continuous length. And the color filter is manufactured by plastering continuously the filter units with various colors in the lateral direction (scanning direction) with the use of, for example, a transparent tacky tape. Accordingly, in the case of this color filter, the connecting portion between the respective filter units necessarily has a structure plastered with a transparent tacky tape.

In the case of the color filter of the prior art as described above, the working of connecting the color filter units is not necessarily easy. This is because the respective color units are arranged in the predetermined order on a working stand and the connecting ends between the respective units are plastered with a tacky tape with a care so that they may not be slipped out of place. Also, when the color filter unit has a singular shape such as a circular shape or a triangle shape, a transparent film in continuous length with a predetermined width is cut at the predetermined portions into shapes corresponding to these singular shapes, and the connecting portions are plastered under the state where singular filter units are fitted therein. Hence such a working requires a considerable skill of an expert.

Further, in the case of this color filter, once respective color filter units are plastered, it is factually impossible to exchange them with new ones. However, it is sometimes desired to exchange a color filter unit positioned at an appropriate position in the color filter in relationship with the performance effect at the site where it is used. In such a case, the above color filter cannot comply with such a situation at all.

Also, during usage of the color filter over a prolonged term, the tacky tape having plastered the respective color filter units may be sometimes peeled off.

SUMMARY OF THE INVENTION

An object of the present invention is to provide a color filter for wind-up system color changer with a novel structure which can cancel the problems as described above and of which color filter unit can be exchanged at the site where it is used.

The color filter for wind-up system color changer of the present model has a structure which is a color filter having two sheets of laminated transparent films in continuous length, having a plural number of units each comprising one sheet of a transparent film folded in two provided in series sealed between the films in continuous length with its line of flection being disposed along the longer direction of the films in continuous length, and the edges of the units on the opposite side to the line of flection being under the state opened.

DESCRIPTION OF THE PREFERRED EMBODIMENTS

Figure 1:
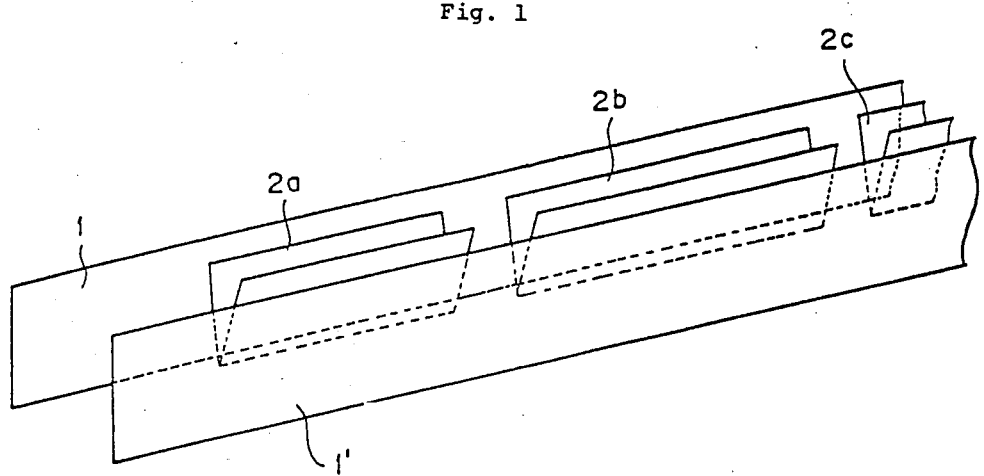
FIG. 1 is an exploded perspective view partially taken away of a color filter of the present invention.
Figure 2:
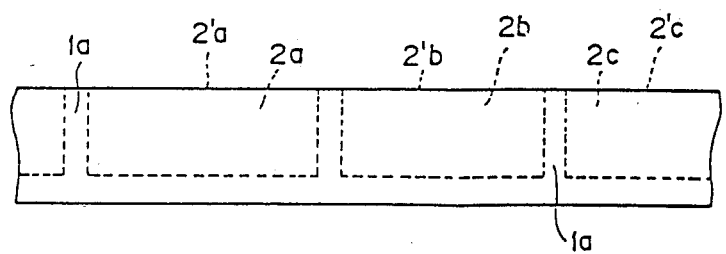
FIG. 2 is its plan view.

Referring now to the drawings, the color filter of the present invention is described in more detail. FIG. 1 is an exploded perspective view showing the positional relationships between the respective elements of the color filter of the present invention, and FIG. 2 is its plan view.

Figure 3:
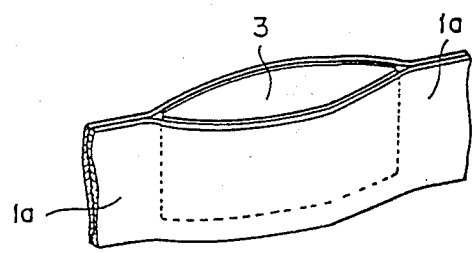
FIG. 3 is a perspective view showing an example of the bag formed in the color filter of the present invention.

In the drawings, reference numerals 1 and 1' are transparent films in continuous length having predetermined width and length, and adhesive layers are formed by coating on the opposed surfaces of the both films so that they can be laminated. Each of 2a to 2c, etc. is a unit comprising one sheet of a transparent film folded in two. These units 2a to 2c are continuously arranged between the films 1 and 1' in continuous length with the portions of line of flection being disposed along the longer direction of the films 1 and 1' in continuous length, and sealed and fixed between the both films 1 and 1' by laminating the films in continuous length. At this time, an edge of these respective units 2a to 2c opposite to the line of flection should be aligned with an edge of the respective transparent films in continuous length. This state is shown as a plan view in FIG. 2. As is apparent from FIG. 2, the films 1 and 1' in continuous length are firmly adhered at the gap portions 1a between the units 2a to 2c and the lines of flection thereof, and lower portions and gap portions of the films 1 and 1' in continuous length. Adhering may be carried out by other means such as welding or solvent welding. And, what is important here is that the edges 2'a to 2'c on the opposite side to lines of flection of the units 2a to 2c are not sealed by the films 1 and 1' in continuous length since they are aligned with the edges of the transparent films 1 and 1' in continuous length. With such a constitution, the units 2a to 2c form bags with the upper portions opened between the films 1 and 1' in continuous length. This state is shown in FIG. 3. Thus, since the lateral ends of the respective units have the gaps 1a adhered of the films 1 and 1' in continuous length, bags 3 with the upper portions being opened are continuously formed in the whole filter.

By housing necessary color filter units in these bags, the color filter of the present invention is formed.

As is apparent from the above description, the color filter of the present invention makes it possible to house color filter units of desired shapes and colors into the openings of the bags 3 or take out them therefrom. That is, exchange of color filter units can be freely done. Also, since the whole assembly is laminated, there is no fear of peel-off which will occur when using tacky tapes, whereby the use life as a filter can be prolonged. Further, even when the color filter was wound-up, no loosening or sagging is occurred.

I claim:

1. A color filter for wind-up system color changer comprising two continuous sheets of laminated transparent film in a series of units each comprising a sheet of a transparent film folded in two and sealed between the films with the line of flection of each folded sheet being disposed along the longitudinal direction of the films the edges of the units opposite to their respective line of flection being unsealed, and a gap formed between adjacent ones of said series of units, said films being adhered to each other in said gap, said units being independently sealed between said films, thereby forming individual bags for housing a series of color filter elements received through said unsealed edge.

2. A color filter according to claim 1, wherein an edge of the folded sheet opposite to the line of flection is aligned with an edge of the respective continuous transparent film.

3. A color filter according to claim 1, wherein said two continuous sheets of transparant film are laminated by means of an adhesive layer.

* * * * *